United States Patent
Bensmann

(10) Patent No.: US 11,873,095 B2
(45) Date of Patent: Jan. 16, 2024

(54) LEADING-EDGE COMPONENT FOR AN AIRCRAFT

(71) Applicant: Airbus Operations GmbH, Hamburg (DE)

(72) Inventor: Stefan Bensmann, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 103 days.

(21) Appl. No.: 17/425,276

(22) PCT Filed: Apr. 27, 2020

(86) PCT No.: PCT/EP2020/061618
§ 371 (c)(1),
(2) Date: Jul. 22, 2021

(87) PCT Pub. No.: WO2020/221692
PCT Pub. Date: Nov. 5, 2020

(65) Prior Publication Data
US 2022/0097822 A1    Mar. 31, 2022

(30) Foreign Application Priority Data
Apr. 29, 2019  (DE) .................... 10 2019 110 948.5

(51) Int. Cl.
*B64C 9/22* (2006.01)
*B64C 3/18* (2006.01)
*B64C 3/28* (2006.01)

(52) U.S. Cl.
CPC ................ *B64C 9/22* (2013.01); *B64C 3/187* (2013.01); *B64C 3/28* (2013.01)

(58) Field of Classification Search
CPC .. B64C 9/22; B64C 3/187; B64C 3/28; B64C 3/18; B64C 3/22; B64C 3/26
See application file for complete search history.

(56) References Cited

U.S. PATENT DOCUMENTS 2,754,915 A * 7/1956 Echeverria, Jr. ...... B64C 27/473
                                                          416/223 R
7,238,409 B1    7/2007 Peterson et al.
(Continued)

FOREIGN PATENT DOCUMENTS

DE    102010006144 A1    8/2011
EP    1364871 A1    11/2003
(Continued)

OTHER PUBLICATIONS

International Search Report and Written Opinion; priority document.
German Search Report; priority document.

*Primary Examiner* — Assres H Woldemaryam
(74) *Attorney, Agent, or Firm* — Greer, Burns & Crain, Ltd.

(57) ABSTRACT

A leading-edge component for an aircraft includes at least a part of a flow body having a front skin and a rib. The front skin comprises a top section, a bottom section and a leading edge arranged therebetween. The rib extends from the bottom section to the top section. The rib comprises a flange that at least partially surrounds the rib. The flange is attached to an inner side of the front skin. The at least one peripheral surface extends from the contact surface inwardly into the flow body and away from the inner side of the front skin or encloses a weakened connection region with the contact surface for bending inwardly into the flow body upon an impact onto the front skin on or adjacent to the at least one peripheral surface.

15 Claims, 2 Drawing Sheets

(56) References Cited

U.S. PATENT DOCUMENTS

| | | |
|---|---|---|
| 8,276,847 B2 | 10/2012 | Maenz |
| 10,266,248 B2 * | 4/2019 | Stanley ................. B64C 1/38 |
| 10,421,528 B2 | 9/2019 | Kismarton et al. |
| 2006/0249626 A1 | 11/2006 | Simpson et al. |
| 2008/0237401 A1 * | 10/2008 | Overbergh ............. B64C 9/24 |
| | | 244/214 |
| 2012/0085867 A1 * | 4/2012 | Bardwell ............. B64D 15/06 |
| | | 244/134 B |
| 2017/0057616 A1 | 3/2017 | Tachibana et al. |
| 2017/0174313 A1 * | 6/2017 | Brakes ................... B64C 9/16 |
| 2018/0118327 A1 * | 5/2018 | Blevins .................. B64C 3/52 |
| 2018/0127081 A1 | 5/2018 | Toral Vazquez et al. |
| 2019/0112029 A1 * | 4/2019 | Turner .................. B64C 3/50 |

FOREIGN PATENT DOCUMENTS

| | | | |
|---|---|---|---|
| EP | 3006189 A1 | 4/2016 | |
| EP | 3135578 A1 * | 3/2017 | ............ B64C 3/185 |
| EP | 3135578 A1 | 3/2017 | |
| EP | 3287361 A1 | 2/2018 | |
| EP | 3318481 A1 | 5/2018 | |
| WO | 2010128299 A1 | 11/2010 | |

\* cited by examiner

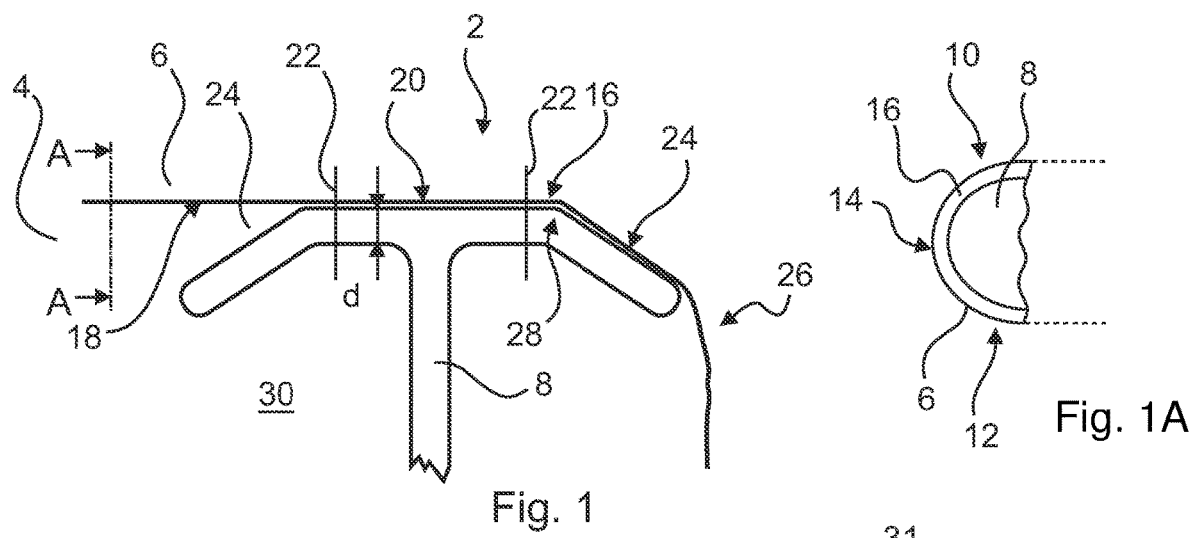
Fig. 1
Fig. 1A
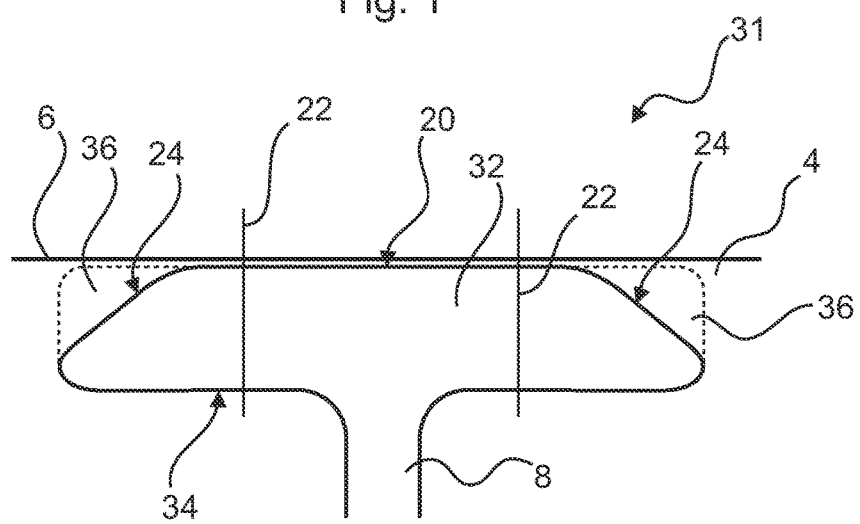
Fig. 2
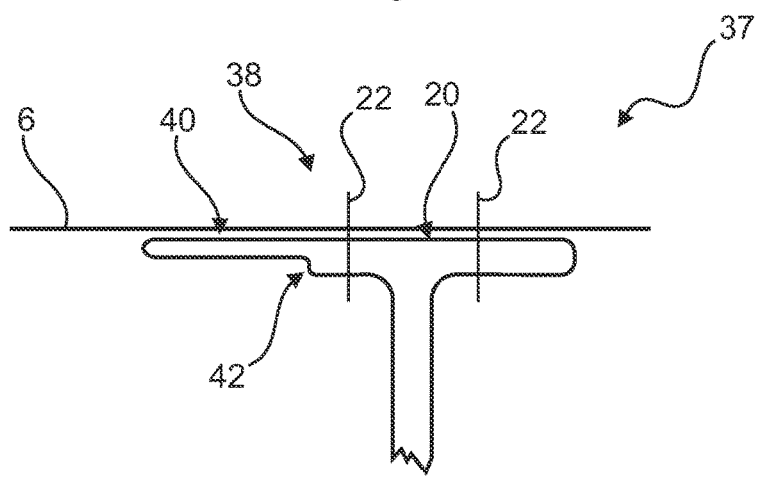
Fig. 3

LEADING-EDGE COMPONENT FOR AN AIRCRAFT

CROSS-REFERENCES TO RELATED APPLICATIONS

This application claims the benefit of the International Application No. PCT/EP2020/061618, filed on Apr. 27, 2020, and of the German patent application No. 102019110948.5 filed on Apr. 29, 2019, the entire disclosures of which are incorporated herein by way of reference.

FIELD OF THE INVENTION

The invention relates to a wing leading-edge component, a wing having a fixed wing body and a wing leading-edge component, as well as an aircraft.

BACKGROUND OF THE INVENTION

Aerodynamic components of an aircraft are designed to meet several aerodynamic requirements of the respective aircraft, which lead to a certain shape exposed to an airflow. For optimizing the weight of the aircraft, usually hollow structures are used, which are stiffened by an interior structure. For example, a leading edge of a flow body used in a commercial aircraft may comprise a skin and ribs attached to an interior side of the skin.

Besides the aerodynamic and weight requirements, also bird strike is a significant scenario for leading-edge regions of a flow body of an aircraft. For example, it is known to provide a reinforcing panel structure on the leading-edge region to withstand impact to a great extent. A rupture of an outer skin of a flow body in the leading-edge region due to an impact should be avoided. For example, EP 3 318 481 A1 shows a panel structure for an aircraft having an improved impact resistance.

SUMMARY OF THE INVENTION

It is an object of the invention to provide an alternate leading-edge component, which has improved impact characteristics for avoiding or delaying ruptures of a skin panel that is stiffened by an interior structure.

A leading-edge component for an aircraft is shown, comprising at least a part of a flow body having a front skin and a rib, wherein front skin comprises a top section, a bottom section and a leading edge arranged therebetween, wherein the rib extends from the bottom section to the top section, wherein the rib comprises a flange that at least partially surrounds the rib, wherein the flange is attached to an inner side of the front skin, and wherein the at least one peripheral surface extends from the contact surface inwardly into the flow body and away from the inner side of the front skin or encloses a weakened connection region with the contact surface for bending inwardly into the flow body upon an impact onto the front skin on or adjacent to the at least one peripheral surface.

The leading-edge component can be any component that is capable of being arranged at a leading edge of an aircraft. For example, it may be a fixed leading-edge component as a part of a wing, of a horizontal tail plane or of a vertical tail plane. However, it may also be a movable component, such as a leading-edge slat or similar, which is designed to move relative to a fixed part of the aircraft.

In the context of the invention, the flow body may be considered an aerodynamic body that has a leading edge, which is exposable to an air flow and which is designed according to the invention. Hence, the leading-edge component may comprise a part of the flow body, such as a part of a fixed leading edge of a wing, or it comprises the whole flow body, such as a movable surface exposed to an airflow.

The front skin may be based on a surface-like component that comprises a significant curvature about a spanwise axis to form an aerodynamically advantageous leading-edge region. For example, the front skin is curved about significantly more than 45°, for example at least 90°. In the course of this curvature, a leading edge separates a bottom section and a top section. The leading edge is a line that may be close to a stagnation point in a certain flight state, such as the cruise flight.

A rib is a stiffening component, which is usually arranged parallel to a chordwise axis of the leading-edge component, which may be parallel to the x-axis, i.e., the longitudinal axis of the aircraft or perpendicular to the sweep angle of the flow body. Objects that hit the leading edge of an aircraft may cause a deformation of the material at the leading edge. By providing a rib with the design proposed according to the invention, the front skin is capable of providing a guided, large and harmonic deformation. Hence, ruptures in the front skin directly adjacent to flanges of the rib or ruptures through a series of connection holes for rivets between the front skin and the flanges can be avoided to a large extent or at least distinctly delayed.

The contact surface of the flange may be a section of a circumferential surface of the flange. The at least one peripheral surface directly follows on from the contact surface and extends away from it in a lateral direction. In doing so, it may also extend away from the inner side of the front skin per se or upon an impact onto the front skin. A transition between the contact surface and the at least one peripheral surface may comprise a distinct edge or kink or it may be rounded. The at least one peripheral surface may, however, also comprise a curvature in a lateral direction. However, it may also have a flat outer surface, such as a stripe shape, that runs along the respective lateral delimitation of the contact surface. The at least one peripheral surface extends from the contact surface in the form of a chamfered edge. By providing the at least one peripheral surface that slightly extends away from the inner side of the front skin, a sharp edge as a lateral delimitation of the flange is avoided. Hence, if a foreign object impacts onto the skin near the rib, the front skin can fold along the at least one peripheral surface, instead of experiencing a distinct shearing force at an edge of the flange, which may lead to a rupture along the flange.

However, the peripheral surface may simply follow on the contact surface in a lateral direction, while a weakened connection region is provided between the peripheral surface and the contact surface. The connection region may be designed in a way that the peripheral surface bends inwardly into the respective flow body upon an impact. It should, however, be designed to only bend if a sufficiently strong impact with a predetermined energy occurs. Hence, the flange may be simpler to manufacture, but also avoids a sharp edge between the contact surface and the front skin to avoid or delay ruptures.

In a preferred embodiment, a transition between the at least one peripheral surface and the contact surface is rounded. Thus, a sharp edge or kink is prevented and the front skin is more harmonically deformed in this region.

It is advantageous if the peripheral surface is angled or curved away from the inner side of the front skin. Thus, the front skin is able to deform in a guided manner from the contact surface to lay down onto the at least one peripheral surface, wherein the depth of an occurring bulge into the interior side continuously increases.

Advantageously, the peripheral surface and the contact surface enclose local angles of at least 10° and particularly of at least 20° at least in a region. Thus, the at least one peripheral surface is limited in the lateral dimension and provides a sufficient guiding function for a deforming front skin.

Preferably, the flange comprises two peripheral surfaces, which are substantially mirror-inverted relative to each other. Hence, either side of the respective flange provides the advantageous function of avoiding or at least delaying a rupture of the front skin according to the invention. However, the peripheral surface of one side may be designed slightly different to conform an increase of a chordwise extension of the respective rib due to a sweep angle of the leading edge of the flow body or a tapering.

Furthermore, the flange may comprise a substantially constant thickness and is bent or curved to form the contact surface and the at least one peripheral surface. Hence, the flange may provide a rather large surface, which includes the contact surface and the at least one peripheral surface, with a least possible weight. The at least one peripheral surface may be realized in a separate part to be joined to a contact surface containing part, or at least the flange may be provided as a single part.

In an advantageous embodiment, the peripheral surfaces are created by removing of material from the flange through a material removal process. Thus, a wide variety of different shapes of the flange can be achieved. The material removal process may include cutting, milling, laser ablation or other.

Still further, an underside of the flange opposite to the contact surface and the at least one peripheral surface may be flat. Hence, given the at least one peripheral surface that extends away from the inner side of the front skin, the thickness of the flange decreases in a lateral direction. The flange thus tends to deform only in laterally outer regions, if at all.

According to a preferred embodiment, the at least one peripheral surface is designed to reduce a shear stress of the front skin upon impact of a moving object onto the front skin. Thus, the flange may comprise rounded edges and a harmonic transition from the contact surface to a laterally outward direction. The overall design of at least the at least one peripheral surface may be conducted under focusing on the shear stress behavior.

As an option, the component is designed to be a fixed component rigidly attachable to a structure. Such a component may, for example, be a fixed leading edge of a wing, a fixed leading edge of a horizontal tail plane or a fixed leading edge of a vertical tail plane. However, many other types of components are conceivable.

However, the leading-edge component may also be designed to be a movable component having a substantially closed surface. It may comprise a back skin arranged rearward of the front skin. For example, the movable component may be a leading-edge flap of a wing and thus a part of a high lift system. The component may be realized in the form of a droop nose, a slat or any other conceivable element.

The invention further relates to a wing for an aircraft, having a leading-edge component according to the above description.

In an advantageous embodiment, the wing further comprises a fixed leading edge, wherein the leading-edge component is movable between a retracted position directly forward the fixed leading-edge and at least one extended position at a further distance to the fixed leading edge. As explained above, the leading-edge component may be a leading-edge flap, which is movable relative to a fixed leading edge of the wing. It may be a droop nose or a leading edge slat, which is capable of providing a translational and rotational motion.

The invention still further relates to an aircraft having at least one wing according to the above description or at least one leading-edge component according to the above description. The aircraft may preferably be a commercial aircraft, a transport aircraft or a military aircraft. It may comprise at least one turbofan or turboprop engine, leading to significant cruise speed and thus to higher expected impact speeds of foreign objects.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIG. 1 shows a first exemplary embodiment of a leading-edge component for an aircraft in a first sectional view.

FIG. 1A shows the embodiment of FIG. 1 in a second sectional view.

FIG. 2 shows a second exemplary embodiment of a leading-edge component for an aircraft in a section view.

FIGS. 3 and 4 show a third exemplary embodiment of a leading-edge component with a foldable connection region.

DETAILED DESCRIPTION OF THE PREFERRED EMBODIMENTS

Figure 4:
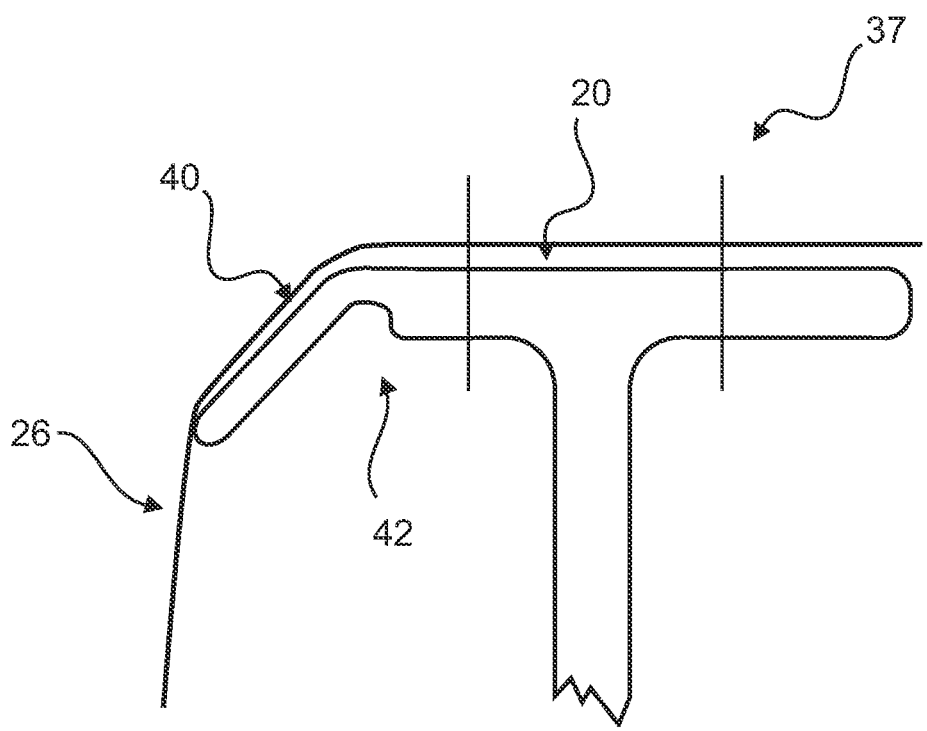

FIGS. 1 and 1A show a section of a leading-edge component 2 for an aircraft. Here, the leading-edge component 2 comprises at least a part of a flow body 4 having a front skin 6 and a rib 8. The front skin 6 comprises a top section 10, a bottom section 12 and a leading edge 14 arranged therebetween. As apparent, the front skin 6 has a significant curvature and is stiffened by the rib 8, which extends from the bottom section 12 to the top section 10 and towards the leading edge 14.

The rib 8 comprises a flange 16 that at least partially surrounds the rib 8. It is attached to an inner side 18 of the front skin 6 and comprises a contact surface 20, which is directly coupled with the front skin 6. The flange 16 may be connected to the front skin 6 by connection means 22, such as rivets or bolts. In this example, two peripheral surfaces 24 are directly adjacent to both lateral sides of the contact surface 20 or the rib 8, respectively. They extend away from the contact surface 20 in a lateral direction and also extend away from the inner side 18 of the front skin 6.

This design leads to a guided deformation of the front skin 6 upon an impact of a foreign object. In FIG. 1, a deformation 26 is shown, which occurs due to the impact. The front skin 6 is deformed to lay onto the peripheral surface 24 in the drawing plane on the right. Hence, there is no sharp edge between the front skin 6 and the flange 16 that causes high shearing stress which may lead to a rupture of the front skin 6. Instead, the deformation 26 has a more harmonic shape and experiences a reduced shearing stress.

A region from a transition 28 between the contact surface 20 and the peripheral surfaces 24, as well as the peripheral surfaces 24, lead to a relaxation of the front skin 6 and a guided deformation 26 into the interior side 30 of the flow body 4. Consequently, the absorption of impact energy is improved and ruptures may largely be avoided or at least delayed.

In this example, the flange 16 comprises a substantially constant thickness d and the peripheral surfaces 24 therefore appear as kinked or bent ends of the flange 16.

In FIG. 2, a leading-edge component 31 having a flange 32 is shown, which also has a contact surface 20, two peripheral surfaces 24, two connection means 22, and a flat underside 34 opposite to the contact surface and the peripheral surfaces 24. The flange 32 may be manufactured through a material removing process, such as milling or cutting. Based on a slightly bulkier cross-sectional profile, the peripheral surfaces 24 are created through cutting away corners 36. However, the deformation behavior of the front skin 6 is substantially the same as with the flange 16 in FIG. 1.

FIGS. 3 and 4 show a further exemplary embodiment in the form of a leading-edge component 37. Here, a flange 38 is provided, which comprises a contact surface 20, two connection means 22 and a peripheral surface 40, which encloses a weakened connection region 42 with the contact surface 20. Hence, upon impact of a foreign object onto the front skin 6, the peripheral surface 40 may deform, i.e., fold, relative to the contact surface 20. From a flush alignment of the paraffin, so face 40, and the contact, so face 20, a similar arrangement of the peripheral surface 40 and the contact surface 20 as shown in FIG. 1 can be achieved. The folding process already absorbs a part of the impact energy and also distinctly guides the deformation 26 into the interior side 30 of the flow body 4.

Figure 5:
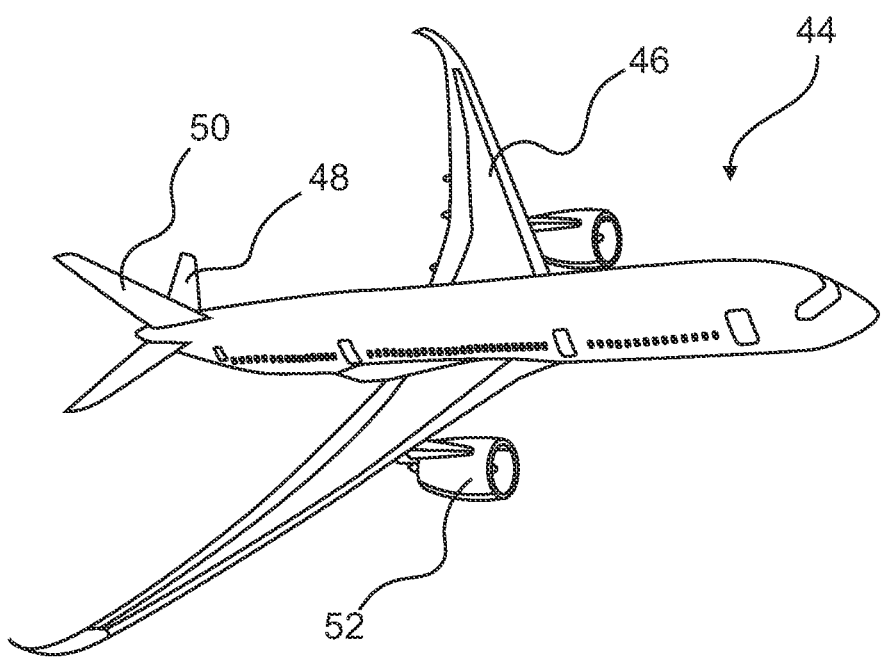
FIG. 5 shows an aircraft having at least one such leading-edge component.

FIG. 5 shows an aircraft 44 having wings 46, a horizontal tail plane 48, a vertical tail plane 50 and engines 52. Each of these elements may comprise a leading-edge component 2, 31 or 37 according to the previous illustrations.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the term "or" means either or both. This disclosure hereby incorporates by reference the complete disclosure of any patent or application from which it claims benefit or priority.

REFERENCE NUMERALS 2 leading-edge component
4 flow body
6 front skin
8 rib
10 top section
12 bottom section
14 leading edge
16 flange
18 inner side
20 contact surface
22 connection means
24 peripheral surface
26 deformation
28 transition
30 interior side
31 leading-edge component
32 flange
34 underside
36 corner
37 leading-edge component
38 flange
40 peripheral surface
42 connection region
44 aircraft
46 wing
48 horizontal tail plane
50 vertical tail plane
52 engine
d thickness of flange

The invention claimed is:

1. A leading-edge component for an aircraft, comprising at least a part of a flow body having a front skin and a rib, wherein the front skin comprises a top section, a bottom section and a leading edge arranged therebetween, wherein the rib extends from the bottom section to the top section, wherein the rib is on the form of a single piece construction, wherein the rib comprises a flange extending transversely outwardly from a central portion of the rib on opposite sides of the central portion of the rib, wherein the central portion of the rib extends inwardly into the flow body in relation to the front skin, wherein the flange at least partially surrounds the central portion of the rib, wherein the flange is attached to an inner side of the front skin, wherein the flange comprises a contact surface directly coupled with the front skin and first and second peripheral surfaces on the opposite sides of the central portion of the rib, and wherein the first and second peripheral surfaces extend from the contact surface inwardly into the flow body and away from the inner side of the front skin at an angle less than 90 degrees or at least one peripheral surface of the first and second peripheral surfaces encloses a weakened connection region of the rib with the contact surface for bending the rib inwardly into the flow body upon an impact onto the front skin on or adjacent to the at least one peripheral surface, wherein the flange comprises a substantially constant thickness and is bent or curved to form the contact surface and the first and second peripheral surfaces.

2. The leading-edge component according to claim 1, wherein first and second transitions between the first and second peripheral surfaces and the contact surface, respectively, are rounded.

3. The leading-edge component according to claim 1, wherein the first and second peripheral surfaces are angled or curved away from the inner side of the front skin.

4. The leading-edge component according to claim 3, wherein the first and second peripheral surfaces and the contact surface enclose local angles of at least 10°, at least in a region.

5. The leading-edge component according to claim 3, wherein the first and second peripheral surfaces and the contact surface enclose local angles of at least 20°, at least in a region.

6. The leading-edge component according to claim 1, wherein the first and second peripheral surfaces are substantially mirror-inverted relative to each other.

7. The leading-edge component according to claim 1, wherein the at least one peripheral surface is created by removal of material from the flange through a material removal process.

8. The leading-edge component according to claim 7, wherein an underside of the flange opposite to the contact surface and the at least one peripheral surface is flat.

9. The leading-edge component according to claim 1, wherein the first and second peripheral surfaces are configured to reduce a shear stress of the front skin upon impact of a moving object onto the front skin.

10. The leading-edge component according to claim 1, wherein the leading-edge component is designed to be a fixed component rigidly attachable to a structure.

11. The leading-edge component according to claim 1, wherein the leading-edge component is configured to be a movable component having a substantially closed surface.

12. A wing for an aircraft, having a leading-edge component according to claim 1.

13. The wing according to claim 12,
further comprising a fixed leading edge,
wherein the leading-edge component is movable between a retracted position directly forward the fixed leading-edge and at least one extended position at a further distance to the fixed leading edge.

14. An aircraft having at least one wing of claim 12.

15. An aircraft having at least one leading-edge component according to claim 1.

* * * * *